United States Patent
Barr

[19]

[11] Patent Number: 6,119,115
[45] Date of Patent: Sep. 12, 2000

[54] METHOD AND COMPUTER PROGRAM PRODUCT FOR REDUCING LOCK CONTENTION IN A MULTIPLE INSTRUCTION EXECUTION STREAM PROCESSING ENVIRONMENT

[75] Inventor: Adam D. Barr, Redmond, Wash.

[73] Assignee: Microsoft Corporation, Redmond, Wash.

[21] Appl. No.: 09/041,258

[22] Filed: Mar. 12, 1998

[51] Int. Cl.$^7$ ..................................................... G06F 17/30
[52] U.S. Cl. ................................ 707/8; 707/9; 709/104; 709/107
[58] Field of Search ................................ 707/8, 9, 201, 707/200–203; 709/104–107, 8

[56] References Cited

U.S. PATENT DOCUMENTS

| | | | |
|---|---|---|---|
| 5,295,262 | 3/1994 | Seigh, II ...................................... | 707/8 |
| 5,414,840 | 5/1995 | Rengarajan et al. ......................... | 707/9 |

OTHER PUBLICATIONS

"Queue Locks on Cache Coherent Multiprocessors," Magnusson et al., Proceedings of the 1994 IEEE Conference, pp. 165–171, Jun. 1994.

"Distributed Shared Memory on IBM SP2," Ramesh et al., Proceedings of the 1997 International Conference on Parallel and Distributed Systems, IEEE, pp. 338–345, Dec. 1997.

*Primary Examiner*—Hosain T. Alam
*Attorney, Agent, or Firm*—Workman, Nydegger & Seeley

[57] ABSTRACT

A method, computer program product, and data structure for reducing the contention for a global lock that impairs system efficiency. An object is assigned or has thereon a positive reference count and a negative reference count. Upon creation, the positive reference count is incremented to indicate creation and the object is placed in a global data structure. When a process thread or other stream of executable instructions initially accesses the data object, the global lock is acquired and the positive reference count incremented to indicate the object is being used. When a process thread or other stream of executable instructions finishes processing the object, an object lock or other assigned lock is acquired (if not already held) and the negative reference count is incremented to indicate that the object is no longer in use by that particular process thread. Upon deletion, the negative reference count is incremented and will now be equivalent with the positive reference count if no process threads are still using the object. The object is destroyed when the positive reference count and the negative reference count are equivalent. The test for when the object should be destroyed occurs at the end of normal use processing as well as deletion processing since the object will not be destroyed until all process threads or other streams of executable instructions have finished their processing. Since the global lock need not be acquired a second time upon finishing processing, excessive global lock acquisition is reduced so that less lock contention occurs.

22 Claims, 8 Drawing Sheets

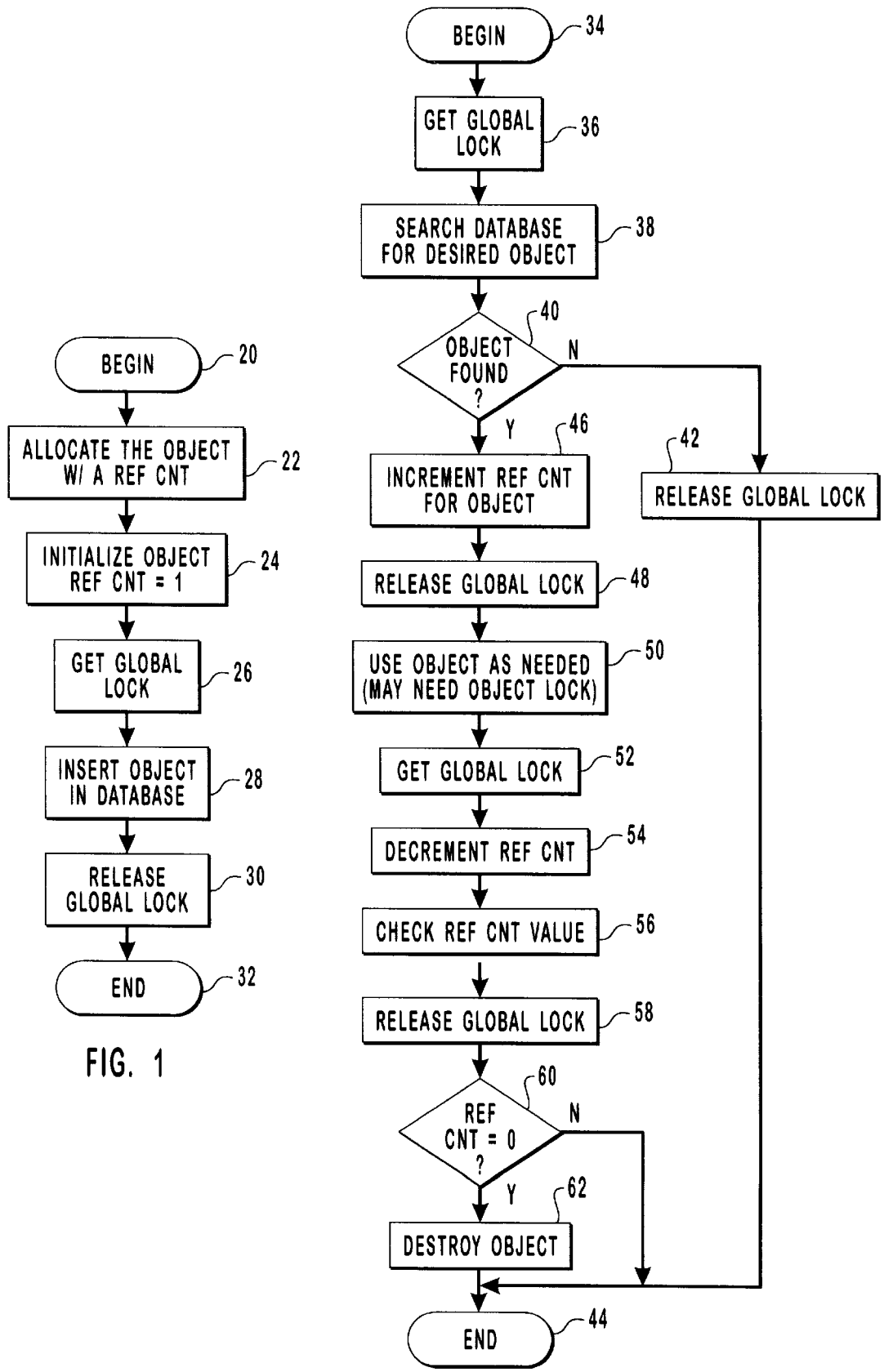

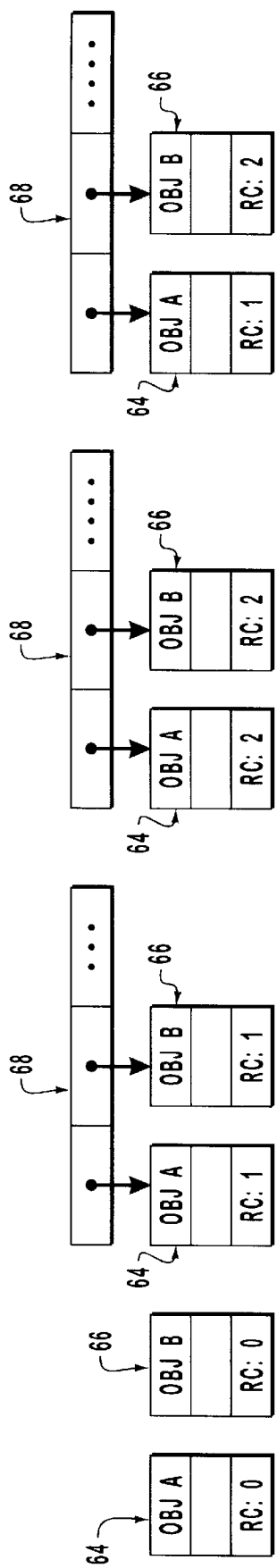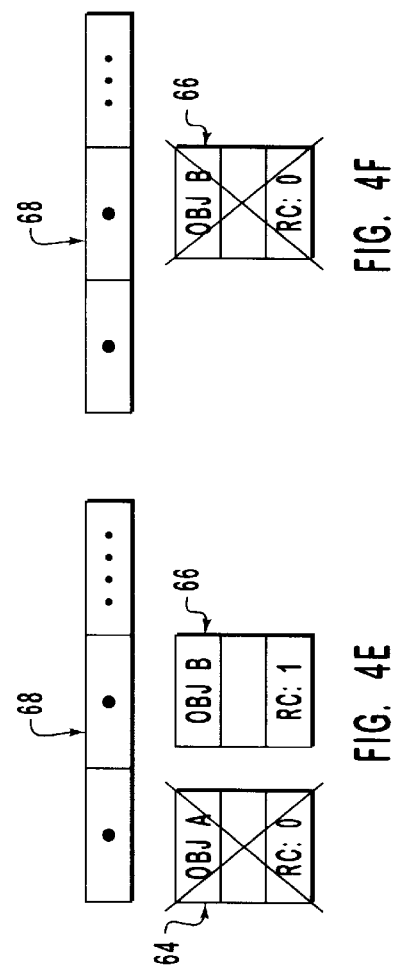

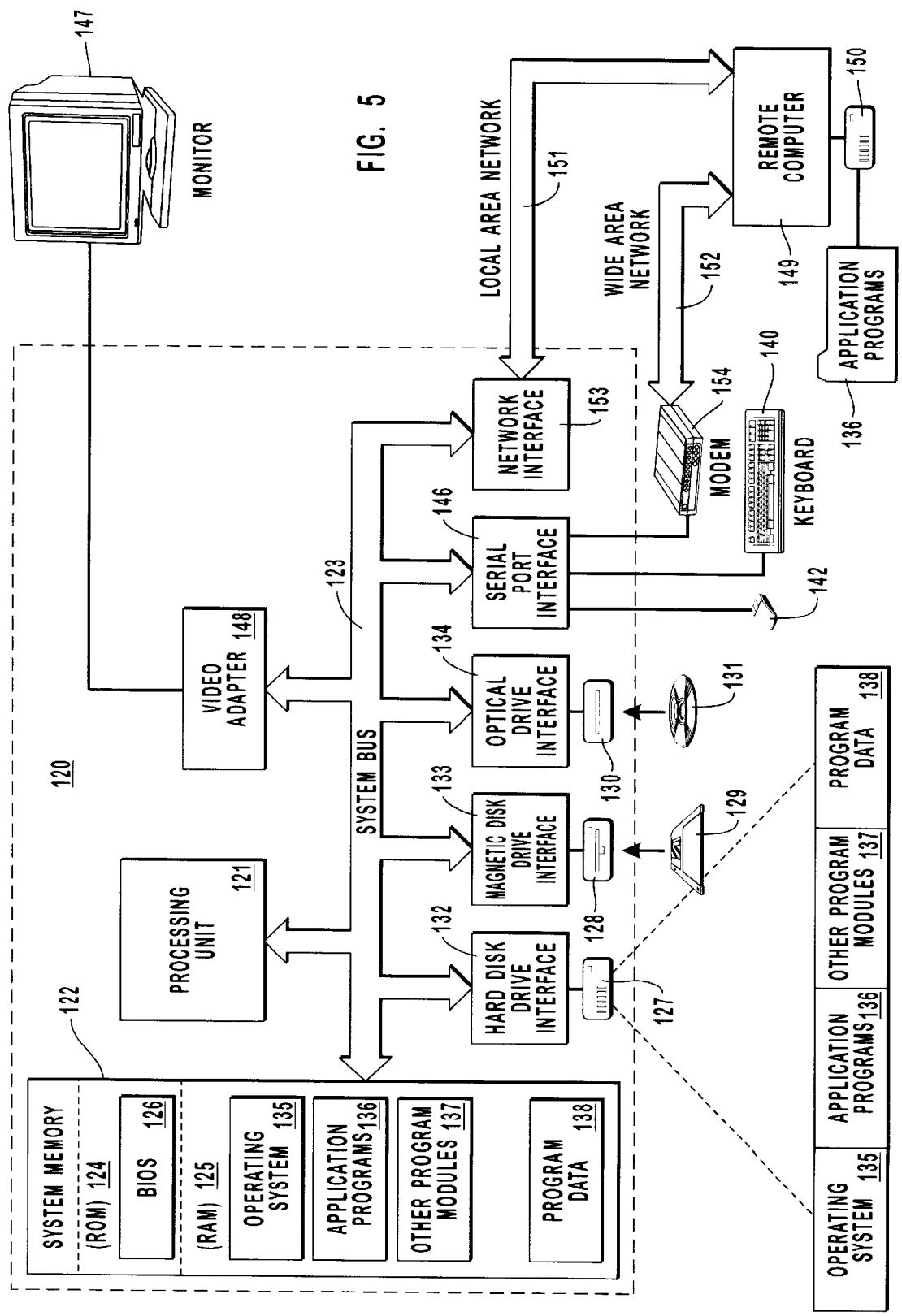

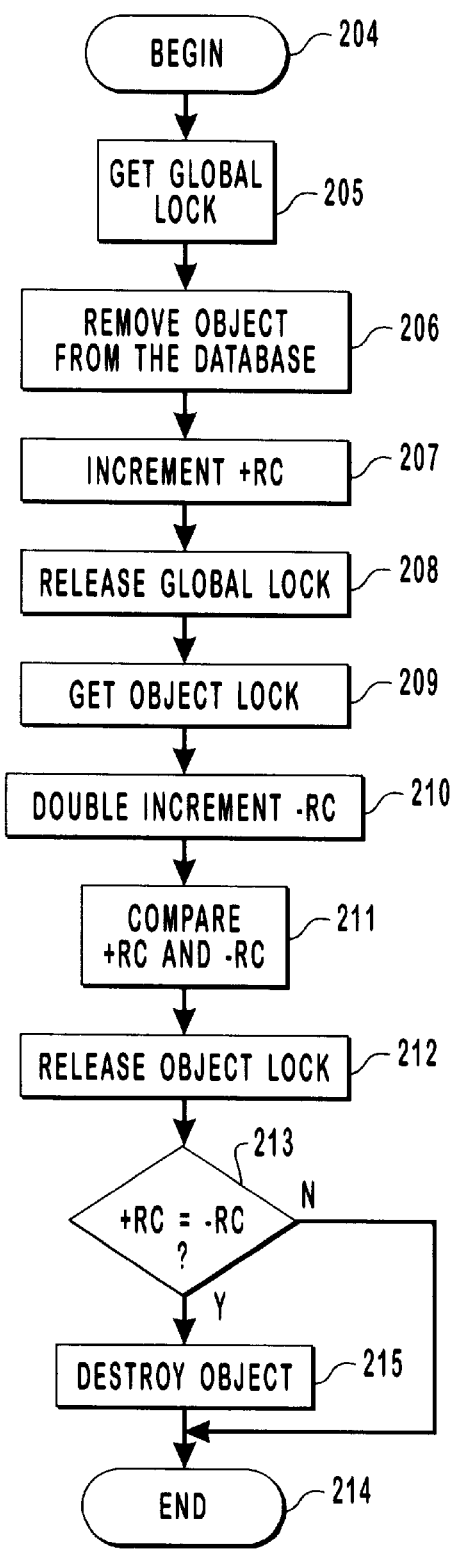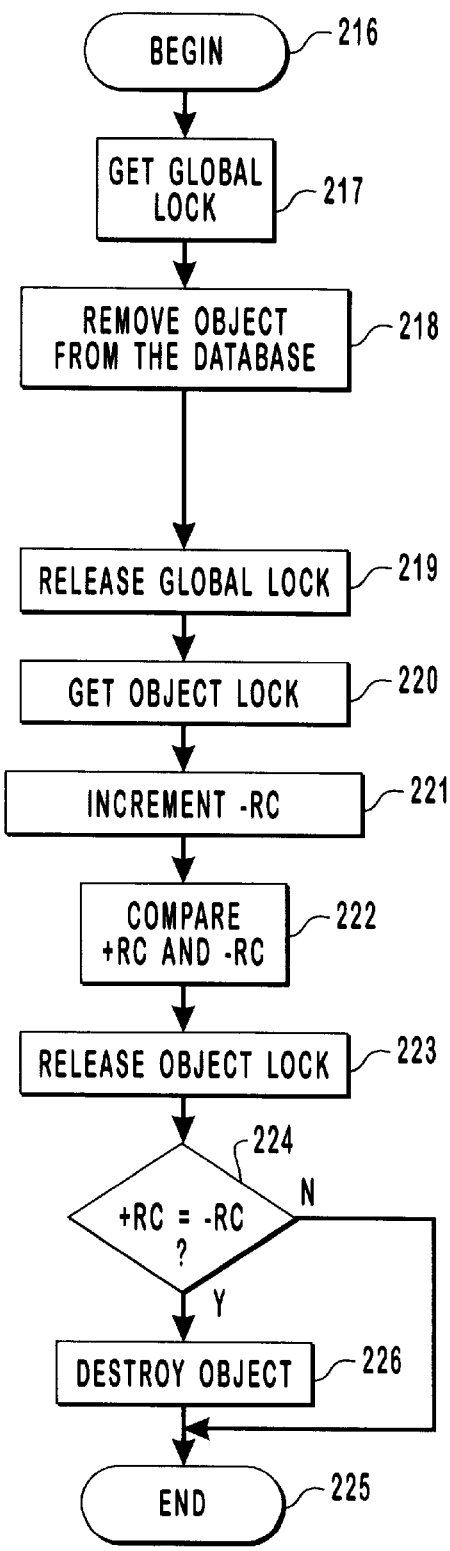
FIG. 8A
FIG. 8B

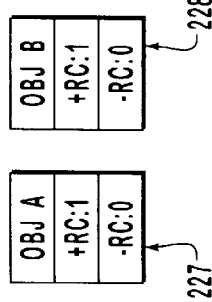
FIG. 9A
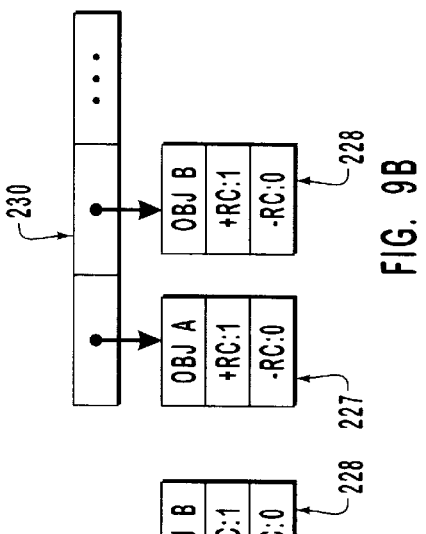
FIG. 9B
FIG. 9C
FIG. 9D
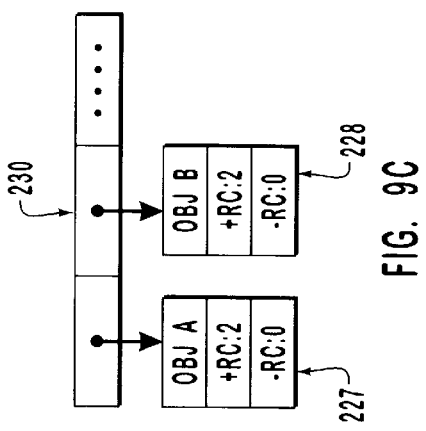
FIG. 9E
FIG. 9F
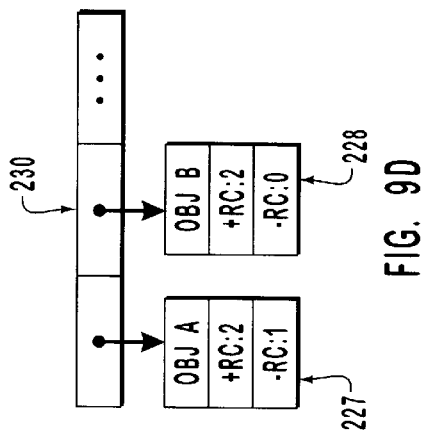

METHOD AND COMPUTER PROGRAM PRODUCT FOR REDUCING LOCK CONTENTION IN A MULTIPLE INSTRUCTION EXECUTION STREAM PROCESSING ENVIRONMENT

BACKGROUND OF THE INVENTION

1. The Field of the Invention

The field of the present invention is that of protecting critical segments of code in an environment where multiple streams of executable instructions may be operating through the critical segment. This occurs typically in multi-tasking operating systems and special structures known as "locks" are used to protect the critical code sections. Particularly, the present invention treats ways of reducing situations where a stream of executable instructions must "wait" on a lock or other protection mechanism that results in degraded system performance.

2. Present State of the Art

In an environment where multiple streams of executable instructions operate independent of one another, such as in a multi-tasking and multi-threaded operating system, certain operations must be performed by a stream of executable instructions to the exclusion of other streams of executable instructions. It is important in some instances to manipulate data in such a manner that only one processing thread operates thereon with no other stream of executable instructions disturbing the data until the operation is finished. For example, when updating a data structure that is common to the multiple streams of executable instructions, it is important that only one stream be making any modifications at a time or otherwise have write-access so that the integrity of the data structure is maintained. In some scenarios, read-access may occur while write-access must only occur in a protected mode.

One mechanism that is used to protect such critical areas of code is known as a "lock." A lock must be held or acquired in order to proceed through the critical area or segment of code. After passing through the critical segment, the lock will be released and another executable stream may acquire or hold the lock. If one executable stream holds a lock and another attempts to access or acquire the lock that is already held, the second executable stream will in some way "wait" upon the lock until it is released by the first executable stream. Such waiting can cause degraded system performance, and it is desirable to reduce such waiting as much as possible.

Since the lock acts as a gate to allow only one stream of executable instructions to operate through a critical segment at any one time, many executable streams vying for a given lock can lead to "contention" for that lock. As a general rule, the more often a given lock needs to be accessed during the course of normal processing for a given application program or system having multiple streams of executable instructions, the greater the potential for lock contention.

A stream of executable instructions may wait on a lock in a variety of different manners depending on the system implementation and nature of the stream of executable instructions. For example, in the Windows NT operating system by Microsoft a stream of executable instructions may be a thread in user mode that will sleep upon encountering an unavailable lock that will in turn "awaken" when the lock later becomes available. As another example, in the Windows NT environment kernel mode operations on a multi-processor system will encounter "spin" locks that control access to common resources such as memory. Therefore, when a spin lock is encountered that is held by another stream of executable instructions on another processor, the encountering processor and stream of executable instructions will simply spin in place and be completely blocked from doing productive work until the spin lock is released.

One situation where lock contention may become a serious performance issue is where a common data structure representing a database known as a database or database structure contains objects that maybe used by one or many different streams of executable instructions. Access to the database structure or a relevant portion of the database structure is controlled by a lock known as a "global lock." This may be a global lock for the entire database structure or for a relevant portion thereof. For example, if employee record objects were contained in a database structure, 26 separate locks could be used to control relevant portions of the database structure based on the first letter of each employee's last name.

Objects may be created, placed in the database, and used as necessary by one or more streams of executable instructions. The objects may be deleted from the database structure and destroyed when they are not longer needed. Since the multiple streams of instructions may be simultaneously operating, a global lock is used to control access to the database structure when creating the object and inserting it into the database structure, searching the database structure to use the object, or removing the object from the database structure and destroying it as part of a delete operation.

Efficient programming techniques mandate that a global lock be held for the minimum of time possible in order to achieve the desired function in order to reduce lock contention amongst the different streams of executable instructions that may need relatively simultaneous access to the database structure. Additionally, a reference count is used to track the life cycle of a particular object. The reference count is initialized at creation to a value of one and will be incremented when a stream of executable instructions begins using the object and decremented when a stream of executable instructions is finished using the object. There will be a final decrementation of the reference count when deleting the object that the reference count value will be zero, signifying that the object is no longer in the database structure and thus can be used no longer. In other words, when an objects reference count reaches zero, the object will be destroyed.

FIGS. 1–4 show how conventional methods are used in a typical scenario that may result in excessive contention for a global lock. FIGS. 1–3 are flow charts corresponding to the operations of creating and placing an object in a database structure, using an object, and removing an object from a database structure and destroying it, respectively, while FIGS. 4A–4F show the creation, placement in a database structure, use, removal from a database structure, and destruction of two objects according to the flow charts in FIGS. 1–3.

Referring to FIG. 1, a flow chart showing the processing steps taken by a stream of executable instructions, such as a process thread, to create an object and place it in a database structure are shown. After beginning processing at step 20, the object is allocated at step 22 with any necessary storage requirements. One variable associated with the object is a reference count or ref count that will track the life of the object. As long as the reference count value is not zero, the object will not be destroyed since it has not been deleted or, if deleted, a stream of executable instructions is still processing the associated object.

The object will be initialized into a known state and the reference count assigned a value of one at step 24. At this point, the object is ready to be inserted into the database or database structure, such as a tree structure, queue structure, linked list structure, etc.

At step 26, the global lock is acquired, thereby blocking any other stream of executable instructions from interfering with the insertion operation. The object is inserted into the database at step 28. This must be done while the global lock is held so that pointers in a linked list or other data structure will not be inadvertently corrupted or read before they are in a stable condition. Finally, the global lock is released at step 30 and processing for the insertion operation ends at step 32.

Referring now to FIG. 2, processing steps taken by a stream of executable instructions for using an object located in a database or database structure are shown. Processing begins at step 34 and the global lock is acquired at step 36 in order to access the database containing object.

At step 38, the database structure is searched for the desired object and a test is made at step 40 to determine whether the object was found. If the object was not found, then the global lock is immediately released at step 32 and processing ends at step 34.

If the desired object is found within the database as determined at step 40, however, processing continues and the reference count for the object is incremented at step 46 in order to indicate that the object is currently being used by another stream of executable instruction and, therefore, should not be destroyed until after the stream is finished if a delete operation occurs before processing is completed.

Once the desired object has been located and the corresponding reference count for that object incremented, it is safe for other streams of executable instructions to have write-access to the object's reference count and to also access the database. Therefore, the global lock is released at step 48 thereby allowing other streams of executable instructions to access the database structure.

The object is processed as necessary by the stream of executable instructions at step 50. Note that if critical data areas are accessed as part of the object processing, other locks, such as an object lock, may need to be acquired.

In any case, once processing is complete by the particular stream of executable instructions, the global lock is acquired once again at step 52 in order to process the reference count value of the object without interference from other streams of executable instructions. First, the reference count is decremented at step 54 in order to indicate that the particular stream of executable instructions has finished processing the object.

Next, the reference count value is checked or remembered at step 56 after being decremented at step 54. This checking step 56 will be used to determine whether or not the object should be destroyed. The global lock is released at step 58 so that other streams of executable instructions can have access to the reference counts for the various objects as well as the database structure wherein the objects are contained.

In conjunction with step 56, a test is made at step 60 to determine whether the reference count value is equal to zero. If the reference count value is not zero at this particular point in time, then the object should remain in existence because it has not been explicitly deleted or another stream of executable instructions continues processing an object that has been indicated for deletion. The processing will then end at step 44.

If the reference count value is equal to zero as determined at step 60, this indicates that no objects are processing this particular object and that is has been explicitly deleted and is now therefore ready to be destroyed. In other words, even though the object had been previously and explicitly deleted, it remained in existence so that the current stream of executable instructions could finish its processing before actually destroying the object at steps 62 and ending processing at step 44. The different scenarios showing the different ways in which an object may be destroyed by either the deletion operation processing or by the stream of executable instructions actually using the object will be shown hereafter in more detail in connection with FIGS. 4A–4F.

Referring now to FIG. 3, a flow chart showing the processing steps for the deletion of an object from a database structure as done in the prior art is shown. By performing the delete operation on a particular object, no other streams of executable instructions will be able to use the object and once the last of any stream of executable instructions is finished processing the particular object, the object will be destroyed. That last stream of executable instructions may be the stream actually doing the delete operation, and if so, that particular stream will actually destroy the object.

Processing begins at step 64 and the global lock is acquired at step 66 in order to access the database structure wherein the object is held. At step 68, the object is found and removed from the database structure though not destroyed at this point.

The object reference count is decremented at step 69. The delete operation decrementation of the object reference count corresponds to the original initialization of the reference count to one so that if no streams of executable instructions are using the object, the reference count will be decremented to zero. The reference count value is checked at step 70 before releasing the global lock at step 72.

A comparison is made at step 74 to see whether the reference count value checked at step 70 is equal to zero. If it is not equal to zero, then the object is still being used by another stream of executable instructions and should not yet be destroyed, and processing will end at step 76. In this scenario, one of the streams of executable instructions that is still using the object will eventually destroy the object as explained previously in connection with step 62 of FIG. 2.

If the reference value is equal to zero as determined at step 74, the object will be destroyed at step 78 before processing ends at step 76. This occurs because no streams of executable instructions, including the current stream, are currently processing the object so that it is then destroyed at step 78.

Referring now to FIGS. 4A–4F, the life cycle of two objects is shown, one where the object is destroyed by the delete operation and another where the object is destroyed by a use operation that necessarily continues processing the object even after the object has been deleted by another stream of executable instructions.

Referring to FIG. 4A, two objects, object A 64 and B 66, are initially created at step 22. After acquisition of the global lock, the objects can be placed into a global data structure, such as global list 68, and have there respective reference count values initialized to one as shown in FIG. 4B. The global lock can then be released and the global list 68 can be accessed by other streams of executable instructions.

Referring to FIG. 4C, the state of object A 64 and object B 66 are shown when two separate streams of executable instructions are currently processing each of the respective objects, one processing object A 64 and the other processing object B 66. This is indicated by the reference count value being two for each respective object, object A 64 and object B 66. This would normally occur at step 46 of the flow chart shown in FIG. 2 when a stream of executable instructions would have incremented the reference count thereby indicating its use of the respective object. Note that such incrementation would occur while the global lock is held.

Referring now to FIG. 4D, the stream of executable instructions that had been processing object A 64 has finished thereby leaving the reference count value at one while the stream of executable instructions that was processing object B 66 continues processing and has not yet finished. This sets up a situation where one object has no stream of executable instructions operations or processing thereon while the other object continues to have a stream of executable instructions operating or processing thereon.

Referring now to FIG. 4E, the results of a delete operation for both object A 64 and object B 66 are shown. By following the processing steps shown in FIG. 3, object A 64 is first removed from the data structure and has the reference count value decremented to zero; this occurring while the global lock is held. Next, since the reference count value is determined to be zero at step 74 of FIG. 3, the object is destroyed at step 78 as indicated by the X through object A 64.

Object B 66 also has a delete operation performed thereon and is therefore removed from the global list 68 and has its reference count value decremented to one while the global lock was held. Object B 66 is not destroyed, however, since a stream of executable instructions continues to use the object during processing.

Referring now to FIG. 4F, the destruction of object B 66 is shown as it will occur after the stream of executable instructions that was using the object has terminated. When finished, the stream of executable instructions decrements the reference count value to zero thereby allowing that particular stream of executable instructions to complete the desired deletion of the object by destroying object B 66. is destruction would occur at step 62 of the flow chart shown in FIG. 2. Note that it is the stream of executable instructions that was using the object rather then the stream of executable instructions that deleted the object that actually destroys the object B 66. This is shown in FIG. 4F by an X drawn through object B 66.

One situation where it is common to observe the above-illustrated scenarios occurs when objects represent visual windows of an application as part of the application's user interface. For example, an e-mail application may have separate windows for each message that is being viewed besides the main application window. In this case, the original application window could be exited thereby signifying the termination of the application as a whole. As part of its termination sequence, the application would delete all objects out of the global list. This will leave situations where the user has not necessarily finished viewing the messages so that the application will continue running until the user signifies being finished viewing messages by manually exiting the individual windows. Such exiting will indicate the end of processing by each separate stream of executable instructions that in turn allows the object representing the window to be destroyed as has been explained previously. Finally, when all the windows have been manually exited, no objects will remain in the global list and the application itself can terminate and be destroyed.

Within the context of the aforementioned background, a serious problem results as the number of objects located in the global database structure becomes very large, or if many different streams of executable instructions desire to operate on a particular object. Under these situations there becomes a large amount of contention for the global lock since many references may be made to the global database structure, such as the global list or queue 68, that holds the objects and must be accessed while the global lock is held. In some cases, the contention for the global lock may cause such delay and wasted CPU cycles that there is excessive overhead on system performance. It is therefore desirable to reduce such lock contention so that system performance is not adversely impacted.

One way of relieving global lock contention is to use a second lock to also control access to the single reference count. Typically, this second lock would be an object lock that is controlling access to the object itself. In this scenario, at the commencement of processing an object, the global lock would be accessed as before followed by an acquisition of object lock while the global lock is being held. The reference count would be adjusted as explained previously and the locks could be released in reverse order so that the object lock acquisition and release occurs entirely while the global lock is held. If the object lock were needed for processing the object, it would have to be required. After processing the object, the second lock, such as the object lock, would be used alone to protect updating the single reference count. This would reduce the global lock contention but requires more lock acquisitions that take CPU cycles and imposes a special ordering on the two locks.

While use of different locks and special ordering between the different locks may be used to alleviate the global lock contention problem somewhat by reducing the number of global lock acquisitions, such schemes require special ordering constraints between the acquisition and release of different locks. Too much ordering constraint may introduce errors in software since such constraints are fully implemented by the programmer and are subject to human error.

What is needed is a way to reduce global lock contention that will minimize global lock acquisitions without introducing burdensome lock ordering constraints. By minimizing the number of global lock acquisitions, fewer streams of executable instructions will be required to wait for the lock thereby improving overall system processing efficiency.

SUMMARY AND OBJECTS OF THE INVENTION

It is an object of the present invention to reduce global lock contention by minimizing global lock access.

It is a further object of the present invention to reduce global lock contention without placing excessive ordering constraints between different locks being used.

It is yet another object of the present invention to increase system processing efficiency in systems that have a global database structure whose access is controlled by a global lock.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method, data structure, and computer program product for reducing lock contention in a multiple instruction execution stream processing environment are provided.

The present invention reduces global lock acquisition by not requiring global lock acquisition when a stream of executable instructions, such as a process thread in a multi-threaded multi-tasking operating system, terminates processing. Currently, the global lock must be accessed so that the reference count may be decremented as explained above.

The ability to eliminate this second access is done by using two reference counts, namely, a positive reference count that is incremented upon creation and when any stream of executable instructions begins processing a particular object, and a negative reference count that is incremented when an object is deleted or when any stream of executable instructions is finished processing a particular object. The object is destroyed when a comparison of the positive and negative reference counts finds that both values are equal.

The global lock continues to be associated with and must be held when making changes (i.e., having write-access) to the positive reference count while another lock may be chosen to control access to the negative reference count. Typically, this will be an object lock that is associated with processing the object itself that may already be held by a stream of executable instructions while processing the object so that a lock acquisition need not occur in many circumstances leading to even better overall system efficiency. No particular ordering of lock acquisition is imposed other than the standard rules that a lock must be held before making changes to the associated reference count.

By eliminating the second global lock acquisition by a stream of executable instructions that currently occurs, global lock acquisition is roughly reduced in half thereby significantly improving system performance. This is particularly true where there are lots of objects in the global database structure or when lots of streams of executable instructions are processing existing objects or any other situation where lock contention causes performance impairment due to object acquisition wait time.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 1 is a flow chart showing the processing steps taken in an environment without the present invention in order to create an object and place it into a database structure.

FIG. 2 is a flow chart showing the processing steps taken in an environment without the present invention illustrating how a stream of executable instructions would use an object that had been placed in the database structure.

FIGS. 4A–4F is a logical diagram that shows sequentially how two objects are created, placed into a data structure, used by a stream of executable instructions, deleted from the data structure, and eventually destroyed according to the processing steps shown in FIGS. 1–3 in an environment without the present invention.

FIG. 5 is a block diagram of an exemplary system for implementing the present invention that includes a general purpose computing device in the form of a conventional, personal computer.

FIG. 8A and 8B are flow charts according to the present invention each showing the processing steps that by a stream of executable instructions must take in order to delete an object from the global database structure and eventually destroy the object if no other streams of executable instructions are currently processing it. FIG. 8B is a simplified version of FIG. 8A.

FIGS. 9A–9F is a logical diagram that shows sequentially how a pair of objects are created, placed into a database structure, processed a thread of executable instructions, deleted from the database structure and eventually destroyed when all pertinent threads of execution have finished each respective object. This figure corresponds to the processing shown in FIGS. 4A–4F except that this processing is done according to the present invention utilizing the flow charts shown in FIGS. 6–8.

DETAILED DESCRIPTION OF THE PREFERRED EMBODIMENTS

Figure 3:
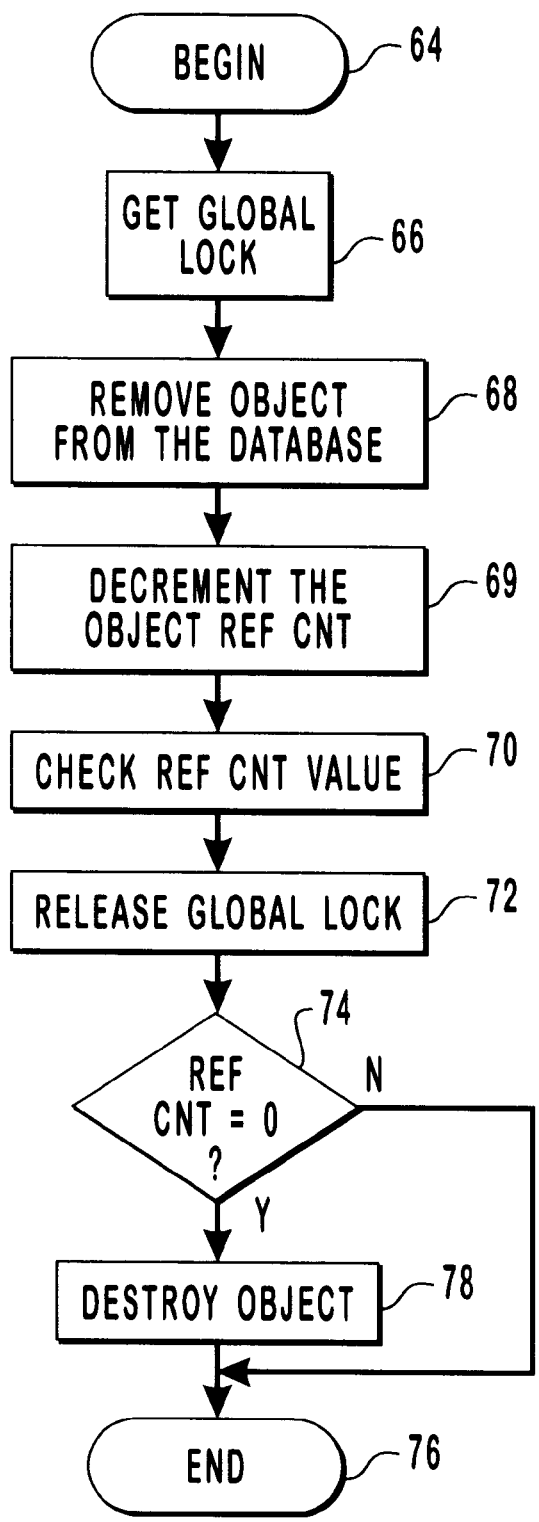
FIG. 3 is a flow chart showing the processing steps taken in an environment without the present invention in order to delete an object out of the database structure and eventually destroy the object.

As used herein, the term "stream of executable instructions" refers to executable instructions operating on a CPU in a computer system. Typically, such streams of executable instructions are controlled by an operating system and can be known by a number of different terms in operating system terminology. For example, a stream of executable instructions could be a process or a process thread that is under control of the operating system. Furthermore, it may be an internal construct of the operating system itself, such as when the system is doing some sort of management function.

As a specific example in the Microsoft Windows NT environment that is not to be construed as limiting, a process thread would be a typical stream of executable instructions while in user mode. Such a thread will sleep when trying to acquire a temporarily unavailable lock that protects a critical segment of the execution stream and thereby waste CPU cycles. In the Windows NT environment, streams of executable instructions that are running in the privileged kernel mode may encounter an unavailable spin lock. This typically occur in a multi-processor environment when another processor holds the spin lock. The stream of executable instructions encountering the unavailable spin lock will cause the processor to simply stop in its processing of the executable stream until the spin lock is released. Such "spinning" is also a waste of CPU cycles.

As used herein, the term "database" or "database structure" or "global database structure" refers to structures that store data and other objects. Important qualities that a data structure will have is the capability of inserting and removing data or objects and the ability to search the structure in order to find a particular object or data contained therein. For example, a tree structure would be a database structure and traversing the tree would be a form of searching that structure. Other examples would include a queue or list that can be scanned in order to find a particular object or even a structure as simple as a standard array containing references to other data structures or objects. As used herein, the term "object" or "data object" refers to any data structure that can be referenced. Furthermore, any referenced entity from a database or database structure could be considered an object.

As used herein, the term "global lock" refers to a lock or other mechanism that is used to control access to a database structure in an environment where there may be multiple streams of executable instructions processed on a CPU, such as occurs in a multi-tasking operating system environment. An "object lock" typically refers to a lock that may be used to control access to processing a particular object. Furthermore, the global lock, an object lock, or other locks may be used to control reference counts that are used for determining an objects life cycle.

FIG. 5 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 5, an exemplary system for implementing the invention includes a general purpose computing device in the form of a conventional personal computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic routines that helps to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to removable optical disk 131 such as a CD ROM or other optical media. The hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus 123, but may be connected by other interfaces, such as a parallel port, game port or a universal serial bus (USB). A monitor 147 or other type of display device is also connected to the system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 5. The logical connections depicted in FIG. 5 include a local area network (LAN) 151 and a wide area network (WAN) 152. Such networking environments are commonplace in offices enterprise-wide computer networks, intranets and the Internet.

When used in a LAN networking environment, the personal computer 120 is connected to the local network 151 through a network or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Figures 6, 7:
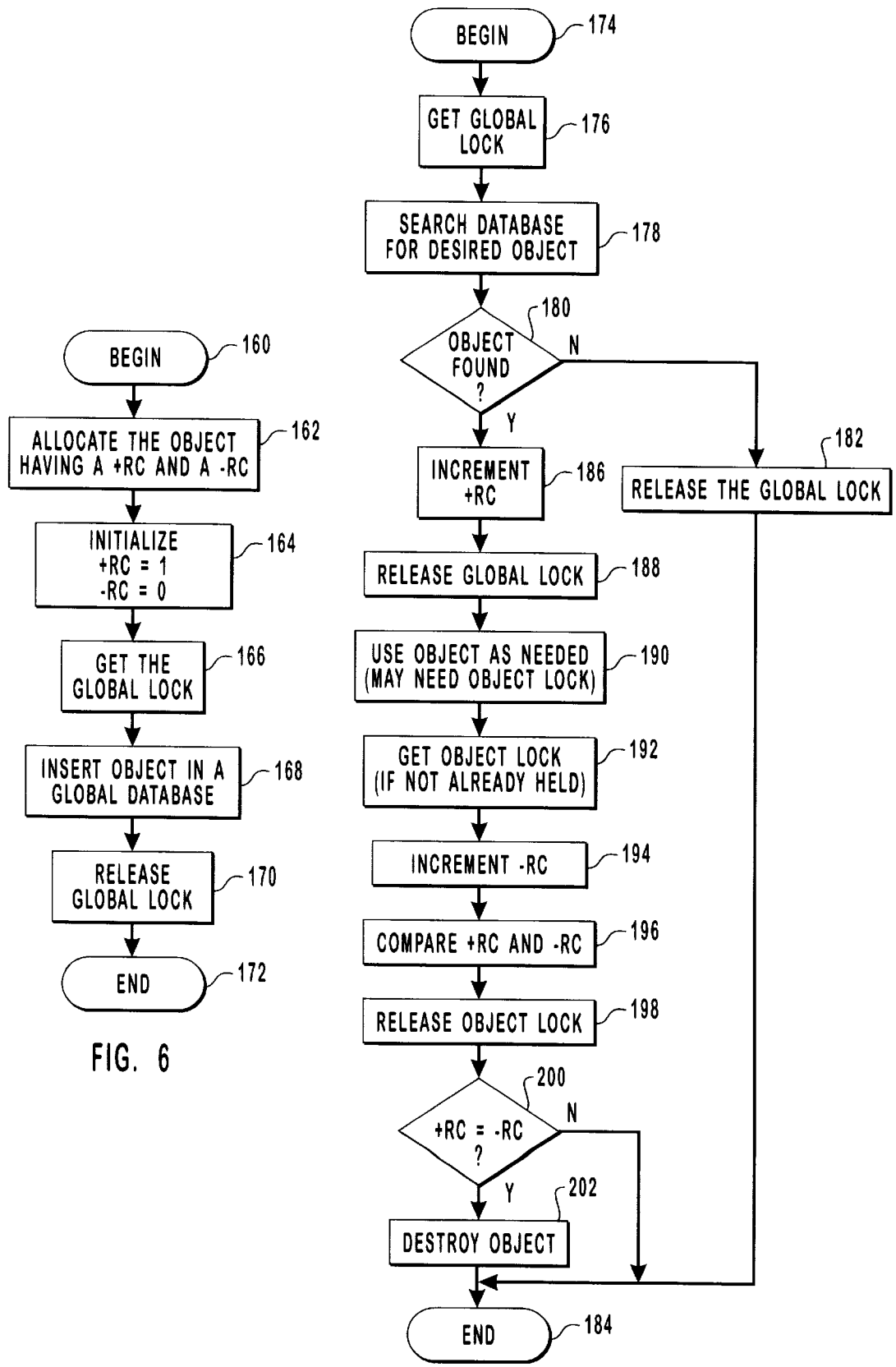
FIG. 6 is a flow chart showing the processing steps according to the present invention that a stream of executable instructions will perform to create an object having a positive reference count and a negative reference count and placing the initialized object into a global database structure.
FIG. 7 is a flow chart according to the present invention that shows the processing steps a stream of executable instructions would take in order to use an object located in the global database structure that requires acquiring the global lock only for beginning processing of the object in the database without making a second acquisition of the global lock upon finishing processing.

With reference to FIGS. 6, 7, and 8, the processing steps taken by the present invention are shown in detail in the respective flow charts. Specifically, FIG. 6 refers to the processing steps allocating and placing an object into a database structure, FIG. 7 shows the processing steps taken for using an object in the database structure, and FIG. 8A shows the processing steps for removing an object from the database structure and destroying the object if appropriate (FIG. 8B is a simplified version of FIG. 8A). Collectively, these Figures represent the life cycle according to the present invention. The invention reduces global lock contention by using two reference counts instead of a single reference count as has been used previously and allowing the number of global lock accesses to be significantly reduced during typical processing.

The two reference counts are known as a positive reference count and a negative reference count. The positive reference count is associated with the global lock and, by convention, can only be incremented while the global lock is held. In like manner, the negative reference could be associated with some other lock, such as an object lock, and, again by convention, can only be incremented while such other lock is held.

Referring now to FIG. 6, a flow chart showing the processing steps taken by a stream of executable instructions for creating and placing an object in a database structure is shown. This flow chart is similar to flow chart 1 explained previously but contains elements peculiar to the present invention and such elements will be explained and highlighted in the following discussion.

After processing begins at step 160, an object is allocated at step 162 that has both a positive reference count and a negative reference count. This can be contrasted with FIG. 1 where the allocated object would have only a single reference count.

The object is initialized at step 164 and part of the initialization is to set the positive reference count value equal to one and the negative reference count to zero. At this point, the object is allocated and initialized and is ready to be placed or inserted into the global database structure, such as a queue, array, binary tree, etc.

Before the global database structure may be accessed, a global lock is acquired at step 166. At this point, the object is inserted into the global database structure at step 168 at the desired location or position. Finally, with the object properly placed within the global database structure, the global lock is released at step 170 and processing for the creation operation ends at step 172.

Referring now to FIG. 7, a flow chart showing the processing steps according to the present invention for a stream of executable instructions to access an object in a database structure is shown. FIG. 7 corresponds in a general way to the currently known operations shown in FIG. 2 but incorporates the method of the present invention. The major difference is that the global lock need not be acquired a second time upon completion of processing which will thereby reduce the contention for that global lock. The reduction in global lock contention is most readily noticed when there are large numbers of streams of executable instructions that operate on many objects found in a particular database.

Processing begins at step 174 and the global lock is acquired at step 176 in order to access the database structure and search for the desired object. Such searching occurs at step 178 followed by a test at step 180 whether or not the desired object was found. If the object was not found, the global lock is released at step 182 and processing ends at step 184.

If the desired object is found as determined at step 180, the positive reference count for the object is incremented at step 186. The positive reference count is incremented to indicate that a particular stream of executable instructions will now be processing or otherwise operating on the particular object so that it will not be deleted until that particular stream of executable instructions has finished its processing. Note that the positive reference count must be incremented or changed while the global object lock is held. Furthermore, note that incrementing commonly means that one is added to the current value of the respective reference count but those skilled in the art will appreciate that other values could be added or the value may be decremented and still function in substantially the same manner.

At this point, the stream has access to the desired object, has indicated by incrementing the positive reference count that it will be using that object, and may release the global lock at step 188. The stream of executable instructions will then use and process the desired object is needed at step 190. Note as part of such processing, it may be necessary to access the object lock.

When the stream of executable instructions has finished processing the object it is necessary to so indicate the termination of processing so that the object may be destroyed if it has been separately deleted by another stream of executable instructions. In order to do this, the object lock or other lock associated with the negative reference count is acquired at step 192. The object lock, if one exists, is a logical choice since the particular stream of executable instructions may already have acquired it as part of processing the object and would therefore need not make an additional lock access. Furthermore, the object lock may already be held by the stream of executable instructions due to previous processing of the object thereby creating a further efficiency since the lock will not have to be acquired in many, if not most, instances depending on code organization.

Note in particular that the global lock need not be acquired a second time It is this particular lack of a second global lock acquisition during the normal usage processing of a particular object that reduces the global lock contention problem that was explained previously in some detail in the background section.

Once the object lock or other lock has been acquired, the negative reference count is incremented at step 194. Again note that incrementing the negative reference count may only occur while the designated lock is held by the executable instructions. Additionally. the positive reference count and the negative reference count are compared at step 196, again while the designated lock, such as the object lock, is held by the stream of executable instructions. Again, this is necessary so that no changes occur to the negative reference count value by other streams of executable instructions.

Once the comparison is made at step 196, the object lock or other designated lock may be released at step 198. At this point, the results of the comparison in step 196 may be tested at step 200 to determine whether or not the positive reference count is equal to the negative reference count. If they are not equal, then the object has either not been deleted or there are other streams of executable instructions that must finish their respective processing of the object. Processing will then end at step 184 for this particular stream of executable instructions processing of the object.

If the positive reference count is equal to the negative reference count as determined at step 200, then this particular stream of executable instructions is the last stream of executable instructions to be using an object that has been previously been deleted so that the object may be destroyed at step 202 before processing ends at step 184.

Referring now to FIG. 8A, a flow chart showing the processing steps taken by a stream of executable instructions according to the present invention in order to delete a particular data object from a global data structure is shown. FIG. 8A incorporates the present invention and corresponds to FIG. 3 explained previously that incorporates a more traditional approach. The processing differences will be highlighted in the following discussion. Again, the present invention incorporates the use of two reference counts and an extra lock to control the extra reference count so that contention for the global lock is reduced.

After processing begins at step 204, the global lock is acquired and processing of the object begins at step 205 in order to remove the object from the database at step 206. Next, the positive reference count is incremented at step 207 in order to comply with the rule that the positive reference count should be incremented when the global lock is acquired. With these two purposes accomplished, removing the object from the database and incrementing the positive reference count, the global lock may then be released at step 208.

Next, the object lock is acquired at step 209 and the negative reference count is doubly incremented as part of the deletion process. Double incrementation is to compensate for the original initialization of the positive reference count upon creation of the object and for the incrementation of the positive reference count that was just done at step 207 by this stream of executable instructions that is removing the object from the database. If no other streams of executable instructions are processing the object, the positive reference count and the negative reference count should now be equal.

Comparison of the positive reference count and the negative reference count occurs at step 211 while the object lock is still held so that no changes can be made to the negative reference count by anyone having write-access thereto. The object lock is released at step 212 thereby allowing normal processing by other streams of executable instructions that are waiting on the object lock to continue.

While the negative reference count will be protected from any changes by another stream of executable instructions since the object lock is held, the positive reference count may be accessed and changed by another stream of executable instructions. This causes some interesting termination sequences that will be explained in more detail hereafter in connection with FIGS. 10A–10D.

Determination is made at step 213 based on the comparison made at step 211 as to whether or not the positive reference count is equal to the negative reference count. If the positive reference count is not equal to the negative count as determined at step 213 processing ends at step 214 since there is another stream of executable instructions using the object that must finish processing before the object can be destroyed. If the positive reference count is equal to the negative reference count as determined at step 213, the object may be destroyed at step 215 since this stream of executable instructions is the only one processing the object and processing will end at step 214. Again, the determination made at step 213 is based on the previous comparison made at step 211.

Referring now to FIG. 8B, a flow chart showing the processing steps taken by a stream of executable instructions according to the present invention in order to delete a particular data object from a global data structure is shown that does so in a more simplified manner than that shown in FIG. 8A. Again, the present invention incorporates the use of two reference counts and an extra lock to control the extra reference count so that contention for the global lock is reduced.

After processing begins at step 216, the global lock is acquired and processing of the object begins at step 217 in order to remove the object from the database at step 218. After removing the object from the database, the global lock may then be released at step 219. Note that the positive reference count is not incremented as was done in the flow chart shown in FIG. 8A.

Next, the object lock is acquired at step 220 and the negative reference count is incremented as part of the deletion process at step 221. The negative reference count need only be singly incremented to compensate for the initialization of the positive reference rather than doubly incremented as was done in the flow chart shown in FIG. 8A because the positive reference count was not incremented when the object was removed from the database. If no other streams of executable instructions are processing the object, the positive reference count and the negative reference count should now be equal.

Comparison is made of the positive reference count and the negative reference count occurs at step 222 while the object lock is still held so that no changes can be made to the negative reference count by anyone having write-access thereto. The object lock is released at step 223 thereby allowing normal processing by other streams of executable instructions that are waiting on the object lock to continue.

Determination is made at step 224 based on the comparison made at step 222 as to whether or not the positive reference count is equal to the negative reference count. If the positive reference count is not equal to the negative count as determined at step 224 processing ends at step 225 since there is another stream of executable instructions using the object that must finish processing before the object can be destroyed. If the positive reference count is equal to the negative reference count as determined at step 224, the object may be destroyed at step 226 since this stream of executable instructions is the only one processing the object and processing will end at step 225. Again, the determination made at step 224 is based on the previous comparison made at step 222.

Referring now to FIGS. 9A–9F, a logical diagram presenting a sequence of events representing the life cycle of objects that are created, used, and deleted according to the present invention as represented in flow charts shown in FIG. 6, FIG. 7, and FIG. 8A, respectively, is shown. FIGS. 9A–9F show the same development in corresponding FIGS. 4A–4F using the present invention rather than the conventional methods explained previously.

Referring now to FIG. 9A, two objects, object A 227 and object B 228 are created with each object having a positive reference count and a negative reference count. This can be contrasted to objects being created that have a single reference count as has been done previously.

The objects are then initialized, including setting the positive reference count value to one and the negative reference count to zero, and placed into a global data structure, such as the list 230. Note that the global lock is first acquired before placing the objects into the global data structure and that the positive and negative reference count values for object A 227 and object B 228 were previously initialized. FIG. 9B shows the state of the initialized objects as they sit in the list 230. FIGS. 9A–9B taken together correspond to the processing steps taken for creating and placing the objects into a database structure as explained previously in more detail in connection with flow charts shown in FIG. 6.

Referring now to FIG. 9C, two streams of executable instructions have acquired the global lock and have performed a search in order to access each respective object in the database structure 230; one on object A 227 and the other on object B 228. Each stream has incremented the positive reference count for each respective object, object A 227 and object B 228, all while the global lock has been held separately for each object. As shown in FIG. 9C, the respective stream of executable instructions will operate on the respective object A 227 and object B 228. While it is possible for the same stream of executable instructions to be operating on both objects, for purposes of this example each stream is a separate and independent stream of executable instructions.

Referring now to FIG. 9D, the stream of executable objects that had previously operated on object A 227 will acquire the object lock or other lock and signify its termination of object A 227 by incrementing the negative reference count value to one as shown. Note that at this point, the stream of executable instructions that is operating on object B 228 will continue to process the object since it has not gone through the termination steps of processing that would increment the negative reference count. Taken together, FIGS. 9C and 9D show the results of the processing steps taken by a stream of executable instructions in order to process an object already existing in the database structure 230 as was explained previously in connection with the flow chart shown in FIG. 7. Note that the stream of executable instructions using object A 227 has finished its processing of that object while the stream of executable instructions using object B 228 has not yet finished processing.

FIGS. 9E and 9F taken together show the deletion or removal of the objects from the database structure 230 as well as the eventual destruction of the objects when all processing thereon is completed. FIG. 9E shows the state of the objects once the delete operation shown in the flow chart of FIG. 8A has been completed. Namely, object A 227 will have been removed from the database structure 230, and have had its positive reference count incremented once while the negative reference count was incremented twice. This will make the positive reference count equal to the negative reference count and therefore allow object A 227 to be destroyed as represented by the X through the object as shown in FIG. 9E.

Object B 228, on the other hand, is not destroyed but only removed from the database structure 230. Again, the positive reference count has been incremented as part of the delete operation as well as the negative reference count being incremented twice. Since another stream of executable instructions other than the one processing the delete operation is still processing object B 228, the positive reference count is still higher or different than the negative reference count as shown in FIG. 9E. Therefore, the object cannot be destroyed at that time until the other stream of executable instructions has finished processing object B 228.

Referring now to FIG. 9F, the state is shown when the stream of executable instructions has finished processing FIG. B 228, and therefore incremented the negative reference count so that the value is now three and equivalent to the value of the positive reference count. When this occurs, the last steps of processing shown in the flow chart of FIG. 7 indicate that the object can now be destroyed as represented by the X through the object as shown in FIG. 9F. Note that the object had already been removed from the database structure 230 so that any other stream of executable instructions desiring to initiate new processing would be unable to do so since it would not find the object B 228 in the database structure 230.

During the termination sequence of either a use operation (steps 192–202 and 184) as shown in the flow chart of FIG. 7 or the delete operation (steps 209–214) as shown in the flow chart of FIG. 8A, only the object lock is held by the stream of executable instructions. By holding the object lock, write-access to the negative reference count is prohibited such that no changes will occur to that negative reference count value other than those made by the stream of executable instructions holding the lock. The same is not true, however, for the positive reference count since write-access to the positive reference count is controlled by holding the global lock. Therefore, scenarios exist where the value of the positive reference count may be changed by a stream of executable instructions while the termination sequence is being performed by another stream of executable instructions holding the object lock. Naturally, such scenarios do not exist in the previously accepted methods since there was only one lock, the global lock, and the single reference count involved.

Figure 10A:
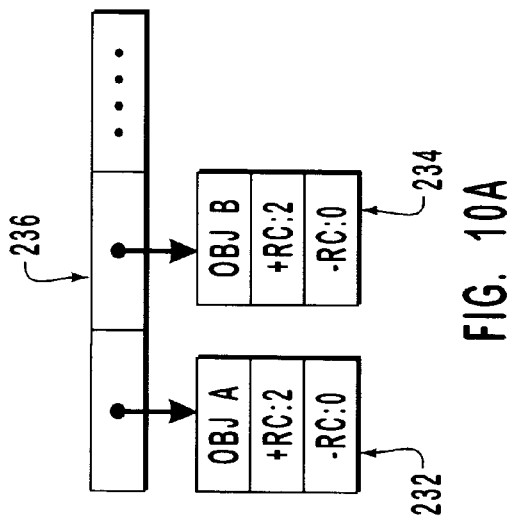
FIGS. 10A–10D shows sequentially how two objects may have different deletion and destruction scenarios when given relatively simultaneous delete commands and processing end operations by different streams of executable instructions. Such differences result since read-access is available to the positive reference count value without holding the global lock. This allows a write-access update of a reference count value to occur and be read during relevant processing by a stream of executable instructions that is not making the write-access so that either the original value or the updated value may be read.

Referring now to FIG. 10A, two objects, object A 232 and object B 234, are found in database structure 236 and are being used by a stream of executable instructions as can be noted by a positive reference count value of two while the negative reference count value is zero in both cases. At this point the objects have been created and are currently being used by one stream of executable instructions.

Figure 10B:
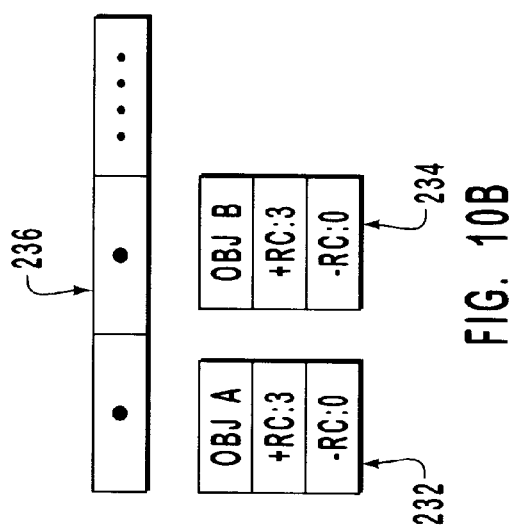

Referring now to FIG. 10B, a delete operation is issued and begun on both object A 232 and object B 234. As part of such delete operation as shown in FIG. 8A, both objects are removed from the database structure 236 and the positive reference count is incremented in both cases such that the value of the positive reference count of both object A 232 and object B 234 is three. This would represent a state of processing immediately after step 207 of FIG. 8A. Note that the delete operation is in process for the respective stream of executable instructions that is operating on each respective object A 232 and object B 234.

Figure 10D:
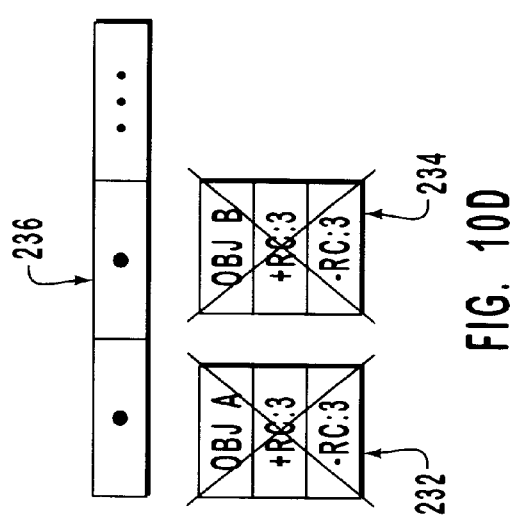
Figure 10C:
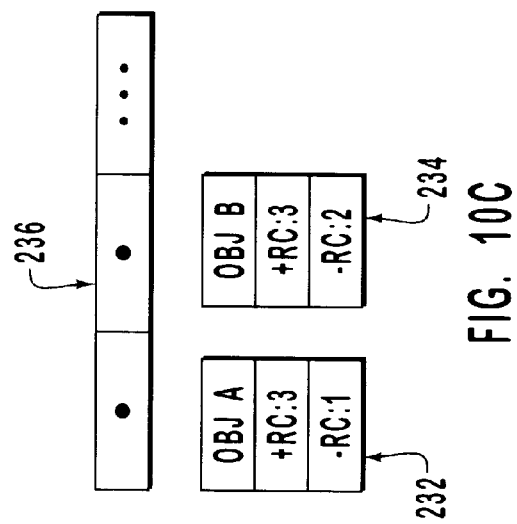

Referring now to FIG. 10C, we note that the stream of executable instructions that had been using object A 232 has completed since the negative reference count value has been incremented to one. Since the delete operation had not yet been double incremented the negative reference count of object A 232, the stream of executable operations that was using object A 232 will not perform the destruction of the object before completing processing.

On the other hand, the negative reference count value for object B 234 has been doubly incremented by the delete operation to a value of two as shown in FIG. 10C. The delete operation will then terminate the processing for object B while the use operation continues to process.

Referring now to FIG. 10D, the destruction of object A 232 and object B 234 is shown with the respective crosses through the respective objects. Note, however, that different operations are performing the actual destruction of the object. For object A 232 it is the delete operation as shown at step 215 of the flow chart in FIG. 8A that destroys the object while for object B 234 it is the use operation as shown at step 202 of the flow chart shown in FIG. 7 that destroys the object. Again, due to timing and scheduling of the streams of executable instructions by an operating system or other management mechanism, different streams may complete the deletion of an object by its destruction depending on finite timing issues. In other words, no matter what the timing issues are, the object will not be destroyed until all streams of executable instructions are finished processing the object.

Furthermore, during normal processing while various threads may be using a particular object, correct results occur even though the reading of the positive reference count occurs without holding the global lock. This is true because a delete situation will not double increment a negative reference value until the object is removed out of the global data structure. Therefore, no new streams of executable instructions may increment the positive reference count since they would be unable to locate the object in the global data structure. Therefore, an object will not be inadvertently destroyed by reading a positive reference count that may be updated while delete processing occurs. In other words, the positive reference count value read by the delete processing stream of executable instructions, whether the original value or the value updated by another stream of executable instructions, will only determine whether the delete processing stream destroys the object or some other stream destroys the object.

Those skilled in the art will note that it is when the positive reference count and the negative count are equal that an object may be destroyed and that the reference count could be decremented rather then incremented and similar results could be attained. Furthermore the designation of a positive reference count and a negative reference count is purely arbitrary and conceptually there are simply two different reference counts, one associated with the global lock and the other with another lock. Furthermore, such reference counts may not be changed or otherwise have write access thereto without a stream of executable instructions holding the appropriate lock.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computing environment containing a database, wherein an object contained in a portion of the database may be accessed by multiple streams of executable instructions, wherein a reference count technique is used to track use of the object by the multiple streams, and wherein access to the portion of the database and therefore access to the object is controlled by a global lock that must be acquired by an executable stream in order to use the object, a computer program product for reducing lock contention for the global lock between the multiple streams of executable instructions that require use of the object, said lock contention causing wasted CPU processing cycles which otherwise occur when a stream is waiting to acquire the global lock when the global lock is already in use by a different stream, said computer program product reducing lock contention by minimizing excess global lock acquisitions without constraints in global lock acquisitions with other locks, the computer program product comprising:

a computer-readable medium; and computer-executable instructions contained on said computer-readable medium for performing the following:

a specific act of assigning to the object a first reference count and a second reference count;

a specific act of selecting a lock to control access to the second reference count;

a specific act of when a stream of executable instructions seeks to use the object, while the global lock is held, locating the object in the database and incrementing the first reference count assigned to the object; and a specific act of after the stream of executable instructions is finished using the object, while the selected lock is held, incrementing the second reference count assigned to the object and comparing the first and second reference counts assigned to the object, and if the first and second reference counts are equal, deleting the object and releasing the selected lock if necessary at some point after the comparison is made between the first and second reference counts.

2. A computer program product as recited in claim 1 wherein the object is initialized with a first reference count value of one and a second reference count value of zero.

3. A computer program product as recited in claim 1 wherein the selected lock for controlling access to the second reference count is an object lock.

4. In a computing environment having multiple streams of executable instructions that operate on objects organized in a database structure, wherein an object is contained in a portion of the database structure, wherein a global lock controls access to at least the portion of the database structure and thereby controls access to the object, a method for reducing lock contention for the global lock between the multiple streams of executable instructions that require use of the object, said lock contention causing wasted CPU processing cycles, the method comprising the following:

a specific act of assigning to the object a first reference count and a second reference count;

a specific act of using the global lock to control write-access to the first reference count on the object;

a specific act of using a selected lock to control write-access for the second reference count on the object; and when a stream of executable instructions accesses the database structure to use the object:

a specific act of while holding the global lock, incrementing the first reference count for the object if the object is found so that the first reference count is incremented each time a stream of executable instructions is processing the object;

a specific act of processing the object as necessary;

a specific act of while holding the selected lock, incrementing the second reference count for the object to indicate that the stream of executable instructions is no longer processing the object so that acquisition of the global lock is unnecessary to complete processing of the object;

a specific act of while holding the selected lock, comparing the first reference count with the second reference count; and a specific act of if the first reference count and the second reference count are equal, destroying the object.

5. A method as recited in claim 4 wherein the object is initialized with a first reference count value of one and a second reference count value of zero.

6. The method as recited in claim 5, wherein the steps of incrementing the first and second reference count comprise steps of altering the value of the first and second reference counts by a value other than one.

7. A method as recited in claim 4 wherein the selected lock is an object lock used to control access to the object.

8. A computer-readable medium having computer-executable instructions for performing the specific acts recited in claim 4.

9. The method as recited in claim 4, wherein the stream of executable instructions is a first stream of executable instructions, wherein the method further comprises:
   a specific act of if the first reference count and the second reference count are not equal, abstaining from destroying the object since the first reference count and second reference count are not equal when either the object has not been deleted, or the object has been deleted but a second stream of executable instructions is still using the object.

10. The method as recited in claim 9, further comprising:
    when the second stream of executable instructions accesses the database structure to use the object:
      a specific act of while holding the global lock, incrementing the first reference count for the object;
      a specific act of while holding the global lock, removing the object from the database structure to indicate a deletion operation;
      a specific act of while holding the selected lock, double incrementing the second reference count;
      a specific act of while holding the selected lock, comparing the first reference count with the second reference count; and
      a specific act of if the first reference count and the second reference count are equal, destroying the object.

11. The method as recited in claim 9, further comprising:
    when the second stream of executable instructions accesses the database structure to use the object:
      a specific act of while holding the global lock, removing the object from the database structure to indicate a deletion operation;
      a specific act of while holding the selected lock, incrementing the second reference count;
      a specific act of while holding the selected lock, comparing the first reference count with the second reference count; and
      a specific act of if the first reference count and the second reference count are equal, destroying the object.

12. The method as recited in claim 4, wherein the specific acts of incrementing the first and second reference count comprise specific acts of altering the value of the first and second reference counts by a value other than one.

13. In a computing environment having multiple streams of executable instructions that operate on objects organized in a database structure, wherein each object has a first reference count, a second reference count, and is contained in a portion of the database structure, wherein a global lock controls access to at least the portion of the database structure containing a desired object, wherein the global lock also controls write-access to the first reference count, and wherein another lock is selected to control write access to the second reference count, a method for reducing lock contention for the global lock between the multiple streams of executable instructions that require use of the object, said lock contention causing wasted CPU processing cycles, the method comprising the steps of:
   while holding the global lock, incrementing the first reference count for the object if the object is found so that the first reference count is incremented each time a stream of executable instructions is processing the object;
   processing the object as necessary;
   while holding the selected lock, incrementing the second reference count for the object to indicate that the stream of executable instructions is no longer processing the object so that acquisition of the global lock is unnecessary to complete processing of the object;
   while holding the selected lock, comparing the first reference count with the second reference count; and
   if the first reference count and the second reference count are equal, destroying the object.

14. A method as recited in claim 13 wherein the object is initialized with a first reference count value of one and a second reference count value of zero.

15. A method as recited in claim 13 wherein the selected lock is an object lock associated with and used to control access to the object.

16. A computer-readable medium having computer-executable instructions for performing the steps recited in claim 13.

17. The method as recited in claim 13, wherein the stream of executable instructions is a first stream of executable instructions, wherein the method further comprises the following step:
    if the first reference count and the second reference count are not equal, abstaining from destroying the object since the first reference count and second reference count are not equal when either the object has not been deleted, or the object has been deleted but a second stream of executable instructions is still using the object.

18. The method as recited in claim 17, further comprising the following steps:
    when the second stream of executable instructions accesses the database structure to use the object:
      while holding the global lock, incrementing the first reference count for the object;
      while holding the global lock, removing the object from the database structure to indicate a deletion operation;
      while holding the selected lock, double incrementing the second reference count;
      while holding the selected lock, comparing the first reference count with the second reference count; and
      if the first reference count and the second reference count are equal, destroying the object.

19. The method as recited in claim 17, further comprising the following steps:
    when the second stream of executable instructions accesses the database structure to use the object:
      while holding the global lock, removing the object from the database structure to indicate a deletion operation;
      while holding the selected lock, incrementing the second reference count;
      while holding the selected lock, comparing the first reference count with the second reference count; and
      if the first reference count and the second reference count are equal, destroying the object.

20. In a computing environment containing a database, wherein a data structure contained in a portion of the database may be accessed by multiple streams of executable instructions, wherein a reference count technique is used to track use of the data strucutre by the multiple streams, and wherein access to the portion of the database and therefore access to the data structure is controlled by a global lock that must be acquired by an executable stream in order to use the data structure, a computer program product for reducing lock contention for the global lock between the multiple streams of executable instructions that require use of the data structure, said lock contention causing wasted CPU processing cycles which otherwise occur when a stream is waiting to acquire the global lock when the global lock is already in use by a different stream, said computer program product reducing lock contention by minimizing excess global lock acquisitions without constraints in global lock acquisitions with other locks, the computer program product comprising a computer-readable medium having stored thereon the data structure, wherein the data structure comprises:

a first data field containing data representing a positive reference count that may be initialized in response to creating the data structure and that is only incremented when a stream of executable instructions using the data structure is holding the global lock, the global lock controlling write-access to the first data field; and a second data field containing data representing a negative reference count that may only be incremented when holding a selected lock that is different than the global lock and in response to deleting the data structure or when a stream of executable instructions is finished using the data structure, the selected lock controlling write-access to the second data field, wherein after processing the data structure, the first data field and the second data field are compared to determine whether or not they are equivalent, and if equivalent, the data structure is destroyed.

21. A data structure as recited in claim 20 wherein the data structure is initialized with a first data field value of one and a second data field value of zero.

22. A data structure as recited in claim 20 wherein the selected lock is an object lock associated with and used to control access to the data structure.

* * * * *

UNITED STATES PATENT AND TRADEMARK OFFICE
CERTIFICATE OF CORRECTION

PATENT NO.     : 6,119,115                                          Page 1 of 1
DATED          : September 12, 2000
INVENTOR(S)    : Adam D. Barr It is certified that error appears in the above-identified patent and that said Letters Patent is hereby corrected as shown below:

Column 2,
Line 42, after "object" and before "that" insert -- so --

Column 5,
Line 11, after "instructions" change "operations" to -- operating --
Line 35, after "66." change "is" to -- This --

Column 6,
Line 20, after "lock" change "were" to -- was --

Column 8,
Line 38, after "10D" change "shows" to -- show --

Column 9,
Line 5, before "in a" change "occur" to -- occurs --

Column 12,
Line 24, after "object" change "is" to -- as --

Column 13,
Line 7, after "previously" delete [been]

Column 15,
Line 7, after "flow" change "charts" to -- chart --

Column 17,
Line 43, after "as" change "illustrated" to -- illustrative --

Signed and Sealed this

Eighteenth Day of June, 2002

*Attest:*

*Attesting Officer*

JAMES E. ROGAN
*Director of the United States Patent and Trademark Office*